(12) United States Patent
Neriishi et al.

(10) Patent No.: US 6,784,448 B2
(45) Date of Patent: Aug. 31, 2004

(54) METHOD FOR READING RADIATION IMAGE FROM STIMULABLE PHOSPHOR SHEET

(75) Inventors: Keiko Neriishi, Kanagawa (JP); Yuichi Hosoi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 29 days.

(21) Appl. No.: 10/083,415

(22) Filed: Feb. 27, 2002

(65) Prior Publication Data

US 2002/0158216 A1 Oct. 31, 2002

(30) Foreign Application Priority Data

Feb. 27, 2001 (JP) ........................................ 2001-052760
Apr. 18, 2001 (JP) ........................................ 2001-119756
Jan. 21, 2002 (JP) ........................................ 2002-011793

(51) Int. Cl.⁷ ............................................. G03B 42/02
(52) U.S. Cl. ....................... 250/584; 250/589; 250/581; 250/586; 250/484.4
(58) Field of Search ................................. 250/584, 585, 250/581, 586, 589, 591, 484.4

(56) References Cited

U.S. PATENT DOCUMENTS

| | | | | |
|---|---|---|---|---|
| 4,944,026 A | * | 7/1990 | Arakawa et al. | 250/484.4 |
| 5,012,107 A | * | 4/1991 | Kano et al. | 250/484.4 |
| 5,023,461 A | * | 6/1991 | Nakazawa et al. | 250/484.4 |
| 5,028,509 A | * | 7/1991 | Shimada et al. | 430/139 |
| 6,307,212 B1 | * | 10/2001 | Huston et al. | 250/580 |
| 6,373,074 B1 | * | 4/2002 | Mueller et al. | 250/584 |
| 6,495,850 B1 | * | 12/2002 | Struye et al. | 250/586 |
| 6,534,779 B1 | * | 3/2003 | Kohda et al. | 250/589 |
| 2001/0006222 A1 | * | 7/2001 | Gebele et al. | 250/584 |

* cited by examiner

*Primary Examiner*—Albert Gagliardi
(74) *Attorney, Agent, or Firm*—Sughrue Mion, PLLC

(57) ABSTRACT

A method for reading a radiation image from a stimulable phosphor sheet composed of a substrate and a stimulable phosphor layer containing a latent radiation image by means of a radiation image-reading means having stimulating light-applying unit and a stimulated emission-collecting unit having a lens and a stimulated emission-receiving plane, which is performed by the steps of applying a stimulating light onto the phosphor layer under the condition that the phosphor sheet moves along its sheet plane in relation to the stimulated emission-collecting unit; collecting a stimulated emission emitting from the area onto which the stimulating light is applied on the emission-receiving plane through the lens; and photoelectrically converting the collected emission into electric signals in the stimulated emission-collecting unit, is improved by moving the stimulable phosphor sheet in relation to the emission-collecting unit under the condition that the stimulating light-applied area of the stimulable phosphor layer is kept apart from the center of the emission-receiving plane with a space in the range defined by a combination of a reference space and a focal depth of the lens, in which the reference space is defined by a length at which the stimulated from the phosphor layer focuses on the plane after passing through the lens.

24 Claims, 10 Drawing Sheets

FIG. 9 (1)
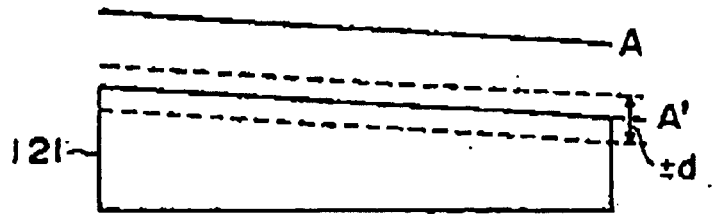
FIG. 9 (2)
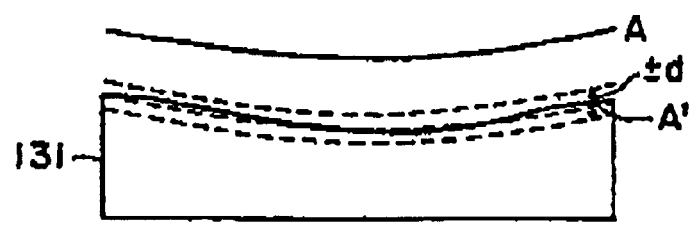
FIG. 10 (1)
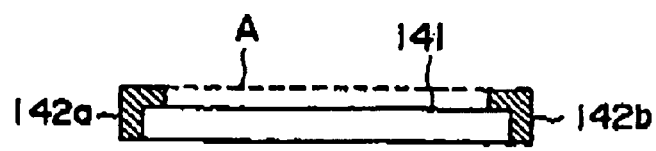
FIG. 10 (2)

METHOD FOR READING RADIATION IMAGE FROM STIMULABLE PHOSPHOR SHEET

FIELD OF THE INVENTION

The present invention relates to a method for reading radiation image from a stimulable phosphor sheet in which a latent radiation image is contained, and an apparatus for the radiation image reading method.

BACKGROUND OF THE INVENTION

When a stimulable phosphor is exposed to a radiation such as X-ray, it absorbs and stores a portion of energy of the radiation. The stimulable phosphor then emits stimulated emission according to the level of the stored energy when the phosphor is exposed to stimulating light.

A radiation image recording and reproducing method utilizing the stimulable phosphor has been widely employed in practice. This method utilizes a stimulable phosphor sheet (also called, radiation image storage panel), and comprises the steps of causing the stimulable phosphor of the phosphor sheet to absorb radiation energy having passed through an object or having radiated from an object; sequentially exciting the stimulable phosphor with a stimulating light such as a laser beam to emit a stimulated emission; and photoelectrically collecting the stimulated emission to convert it into electric signals. The stimulable phosphor sheet thus processed is then subjected to a step for erasing radiation energy remaining therein, and then stored for performing the next image recording and reproducing procedure. Thus, the stimulable phosphor sheet can be repeatedly used.

The stimulable phosphor sheet has a basic structure comprising a support and a stimulable phosphor layer provided thereon. On the free surface (surface not facing the support) of the phosphor layer, a protective film is generally placed to keep the phosphor layer from chemical deterioration or physical damage.

The stimulable phosphor layer generally comprises a binder and stimulable phosphor particles dispersed therein, but it may consist of agglomerated phosphor without binder. The phosphor layer containing no binder can be formed by firing process. Further, the stimulable phosphor layer can be produced by a gas phase deposition method.

A modified process for reading the radiation image in the form of simulated emission is also proposed so as to shorten the time for reading, to downsize the apparatus, and to reduce the production cost. In the-proposed process, the radiation image is divided to form pixels on a photodetector (such as a two-dimensional solid image pickup device or a semiconductor line sensor) to obtain a time-dependent series of image signals through an electric circuit. Also known is an apparatus for performing a process comprising the steps of exposing a stimulable phosphor sheet to a stimulating light emitting from a light source (e.g., a fluorescent lamp) through a slit for linearly stimulating the phosphor sheet (that is, line stimulation), and collecting the stimulated emission emitting from the phosphor sheet by a line sensor which is composed of a number of photoelectric converting elements (that is, line detection). The line sensor is employed under the condition that it would face the stimulating light-exposed area of the phosphor sheet.

In the conventional procedure for reading the stimulated emission, a light-collecting guide and a photodetector such as a photomultiplier are used in combination. Since the emission coming out of the area exposed to the stimulating light (such as laser beam) is almost completely collected by the light-collecting guide, the image quality such as sharpness depends on the amount of the emission coming from the phosphor sheet. This means that the image quality depends on the thickness of the stimulable phosphor layer. It is, therefore, important to prepare the phosphor layer having an even thickness in order to obtain a radiation image having even image quality.

In the aforementioned modified process, a light-collecting lens such as a SELFOC lens array is used for efficiently collecting the stimulated emission onto the line sensor. The stimulated emission is collected and condensed by the light-collecting lens so that an image would be formed on the light-receiving plane of the line sensor.

It has been now found that for obtaining a clear image, the distance between from which the stimulated emission emits and the emission-receiving plane should be in a specific range. Particularly, if the distance between the light-collecting lens and the surface of the phosphor sheet varies even slightly, the area sighted by the lens so varies that the light-collecting efficiency considerably varies. Consequently, even the slight variation of the distance between the emission-receiving plane and the surface of the stimulable phosphor layer impairs the image quality such as sharpness considerably. The inventors have thus found that in the line detection, the image quality depends on the variation of the distance between the emission-receiving plane of the radiation image-reading means and the surface of the stimulable phosphor layer rather than the thickness of the stimulable phosphor layer.

The inventors have further studied the quality of radiation image obtained by the line detection, and found that the surface irregularities of the stimulable phosphor sheet, particularly the surface irregularities of the stimulable phosphor layer impairs the image quality. The stimulable phosphor layer is formed by, for example, a coating method or a gas phase deposition method, but by any method it is almost impossible to make the surface having no irregularities. In fact, on the surface of the phosphor layer, there usually are produced both microscopic unevenness (roughness in the order of 1 to 100 $\mu$m) and macroscopic irregularities (e.g., irregularities of the thickness of the phosphor layer). The microscopic unevenness may not affect the image quality because it is within single pixel corresponding to each photoelectric converting element of the line sensor. The macroscopic irregularities, however, cause variation of the distance between the emission-receiving plane and the surface of the stimulable phosphor layer, and accordingly sometimes give a radiation image having uneven image quality.

In the conventional radiation image-reading apparatus, a stage on which the stimulable phosphor sheet is placed is fixed and the distance between the stage and a stimulated emission-collecting means (comprising the emission-collecting lens and the line sensor) is fixed. However, it has been found that the distance between the stimulable phosphor layer and the stimulated emission-receiving plane cannot be satisfactory kept at a constant length only by fixing the phosphor sheet onto the stage because the thickness of the stimulable phosphor layer is not strictly the same in the whole area.

SUMMARY OF THE INVENTION

An object of the present invention is to provide an improved method for reading radiation image from a stimulable phosphor sheet in which a latent radiation image is contained.

Another object of the invention is to provide an apparatus for performing the radiation image reading method of the invention.

The present invention resides in a method for reading a radiation image from a stimulable phosphor sheet comprising a transparent substrate and a stimulable phosphor layer containing therein a latent radiation image by means of a radiation image-reading means comprising a stimulating light-applying unit and a stimulated emission-collecting unit comprising a lens and a stimulated emission-receiving plane, which comprises the steps of applying a stimulating light onto the stimulable phosphor layer under the condition that the stimulable phosphor sheet moves along a sheet plane thereof in relation to the stimulated emission-collecting unit; collecting a stimulated emission emitting from the area onto which the stimulating light is applied on the stimulated emission-receiving plane through the transparent substrate and lens; and photoelectrically converting the collected emission into electric signals in the stimulated emission-collecting unit, wherein the stimulable phosphor sheet moves in relation to the stimulated emission-collecting unit under the condition that the stimulating light-applied area of the stimulable phosphor layer is kept apart from the center of the stimulated emission-receiving plane with a space in the range defined by a combination of a reference space and a focal depth of the lens, the reference space being defined by a length at which the stimulated emission emitting from the stimulable phosphor layer focuses on the stimulated emission-receiving plane after passing through the transparent substrate and lens.

In the above-mentioned method of the invention, it is preferred that the stimulable phosphor sheet has a reference plane area on both side surfaces of the transparent substrate on the side of the stimulable phosphor layer and the stimulable phosphor sheet is moved under the condition that the phosphor sheet is supported at the reference plane areas on a supporting means which is arranged in a position fixed in relation to the stimulated emission-collecting unit.

Also preferred is that the stimulable phosphor sheet has a reference plane area on both side surfaces of the transparent substrate on the side of the stimulable phosphor layer, the stimulable phosphor sheet is supported at the reference plane areas on a supporting means, and the stimulated emission-collecting unit is moved on the supporting means.

In the above-mentioned method of the invention, it is preferred that the stimulating light-applying unit and stimulated emission-collecting unit of the radiation image-reading means are arranged on the side facing the transparent substrate of the stimulable phosphor sheet.

The present invention also resides in a radiation image reading apparatus for performing the radiation image reading method of the invention, which comprises the radiation image reading means, the supporting means which is arranged in a position fixed in relation to the radiation image-reading means and allows movement of the stimulable phosphor sheet along the sheet plane by supporting the stimulable phosphor sheet at the reference plane areas, and a driving means for driving the movement of the stimulable phosphor sheet.

The present invention also resides in a radiation image reading apparatus for performing the radiation image reading method of the invention, which comprises the radiation image-reading means, the supporting means which is arranged in a position fixed in relation to the stimulable phosphor sheet and allows movement of the radiation image-reading means, and a driving means for driving the movement of the radiation image-reading means.

The present invention further resides in a method for reading a radiation image from a stimulable phosphor sheet comprising a substrate and a stimulable phosphor layer containing therein a latent radiation image by means of a radiation image-reading means comprising a stimulating light-applying unit and a stimulated emission-collecting unit comprising a lens and a stimulated emission-receiving plane, which comprises the steps of applying a stimulating light onto the stimulable phosphor layer under the condition that the stimulable phosphor sheet moves along a sheet plane thereof in relation to the stimulated emission-collecting unit; collecting a stimulated emission emitting from the area onto which the stimulating light is applied on the stimulated emission-receiving plane through not the substrate but the lens; and photoelectrically converting the collected emission into electric signals in the stimulated emission-collecting unit, wherein the stimulable phosphor sheet moves in relation to the stimulated emission-collecting unit under the condition that the stimulating light-applied area of the stimulable phosphor layer is kept apart from the center of the stimulated emission-receiving plane with a space in the range defined by a combination of a reference space and a focal depth of the lens, the reference space being defined by a length at which the stimulated emission emitting from the stimulable phosphor layer focuses on the stimulated emission-receiving plane after passing through the lens.

In the above-mentioned method of the invention, it is preferred that the stimulable phosphor sheet has a reference plane area on both side surfaces of the substrate on the side of the stimulable phosphor layer and the stimulable phosphor sheet is moved under the condition that the phosphor sheet is supported at the reference plane areas on a supporting means which is arranged in a position fixed in relation to the stimulated emission-collecting unit.

Also preferred is that the stimulable phosphor sheet has a reference plane area on both side surfaces of the substrate on the side of the stimulable phosphor layer, the stimulable phosphor sheet is supported on a supporting means, and the stimulated emission-collecting unit is moved on the reference plane areas of the stimulable phosphor sheet.

The invention also resides in a radiation image reading apparatus for performing the above-mentioned radiation image reading method of the invention which comprises the radiation image-reading means, the supporting means which is arranged in a position fixed in relation to the radiation image-reading means and allows movement of the stimulable phosphor sheet along the sheet plane by supporting the stimulable phosphor sheet at the reference plane areas, and a driving means for driving the movement of the stimulable phosphor sheet.

The invention also resides in a radiation image reading apparatus for performing the above-mentioned radiation image reading method of the invention which comprises the radiation image-reading means, the supporting means which is arranged in a position fixed in relation to the stimulable phosphor sheet, and a driving means for driving the movement of the radiation image-reading means on the reference plane areas of the stimulable phosphor sheet.

The invention furthermore resides in a stimulable phosphor sheet comprising a rigid substrate, a stimulable phosphor layer having irregularities on a surface thereof, and a reference plane-forming guide means attached to the rigid substrate on both side surfaces thereof, the reference plane-forming means having a surface of irregularity identical to those of the surface of the stimulable phosphor layer.

In the stimulable phosphor sheet, if the stimulable phosphor layer has a curved, deformed or sloping surface thereon, the reference plane-forming guide means should have a surface identical to the surface of the stimulable phosphor layer The stimulable phosphor sheet of the invention preferably is in the form of one of the following embodiments:

1) The transparent substrate has a reference plane area on which the surface has irregularities within ±100 μm in terms of a mean irregularity height.
2) The transparent substrate is a rigid transparent substrate such as glass sheet.
3) The stimulable phosphor layer has a stimulated emission-reflecting layer on the side not facing the substrate.
4) The stimulable phosphor layer is produced by a gas phase deposition method.
5) The stimulable phosphor sheet has on a surface of the stimulable phosphor layer irregularities within ±50 μm in terms of a mean irregularity height.
6) The substrate is a rigid substrate.
7) The rigid substrate is made of material having a modulus of elasticity of $1 \times 10^5$ kgf/cm$^2$ or higher and a thickness in the range of 200 μm to 10 mm, preferably 100 μm to 10 mm.
8) The substrate is placed on a rigid auxiliary substrate, which is made of material having a modulus of elasticity of $1 \times 10^5$ kgf/cm$^2$ or higher and a thickness in the range of 200 μm to 10 mm, preferably 100 μm to 10 mm.

BRIEF DESCRIPTION OF DRAWINGS

FIG. 9(1) and FIG. 9(2) show enlarged sectional views of other examples of the stimulable phosphor sheet of the invention.

FIG. 10(1) and FIG. 10(2) show sectional views showing examples of a reference plane-forming means according to the invention.

DETAILED DESCRIPTION OF THE INVENTION

The constitution of a stimulable phosphor sheet of the invention is explained below by referring to the attached drawings.

Figure 1:
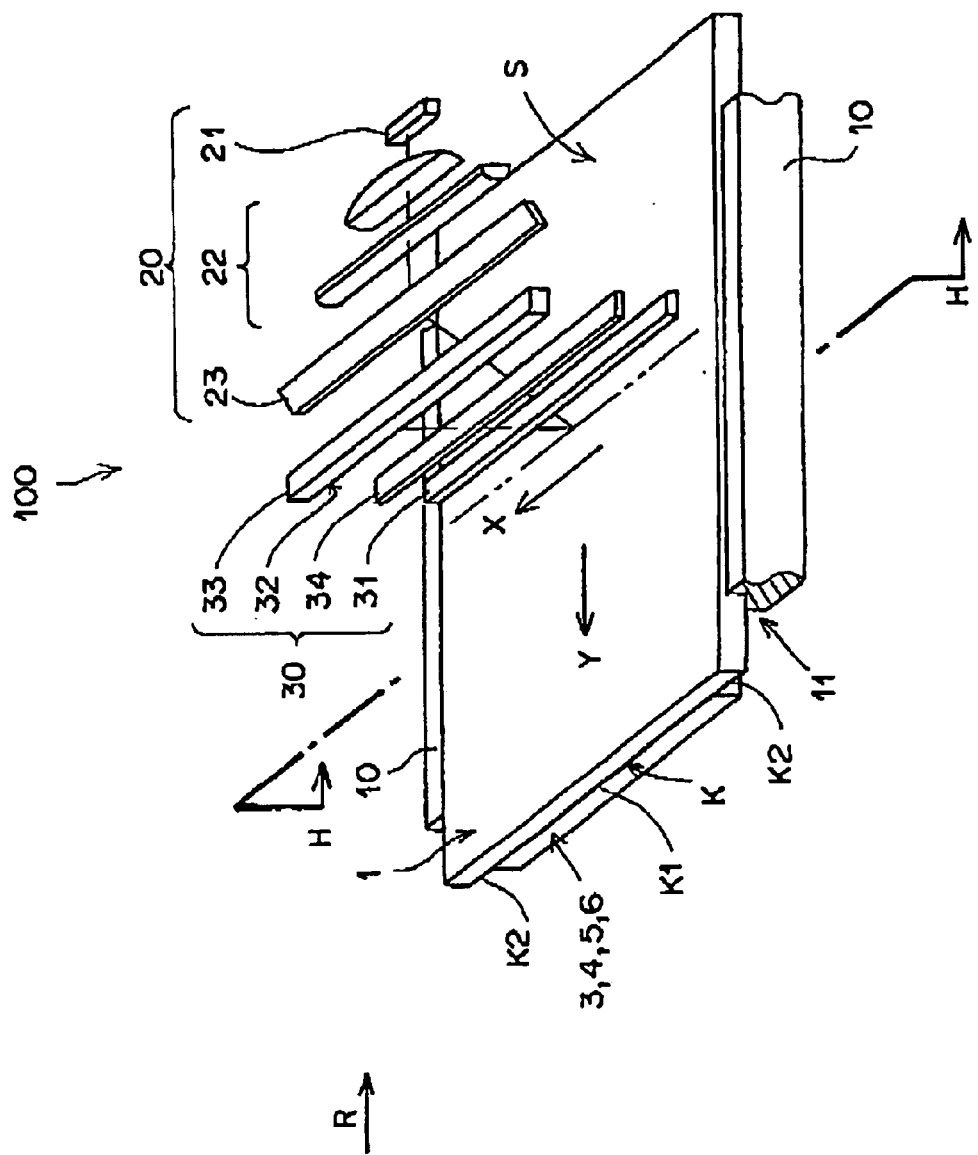
FIG. 1 is a schematic view in which a radiation image-reading apparatus of the invention is illustrated.
Figure 2:
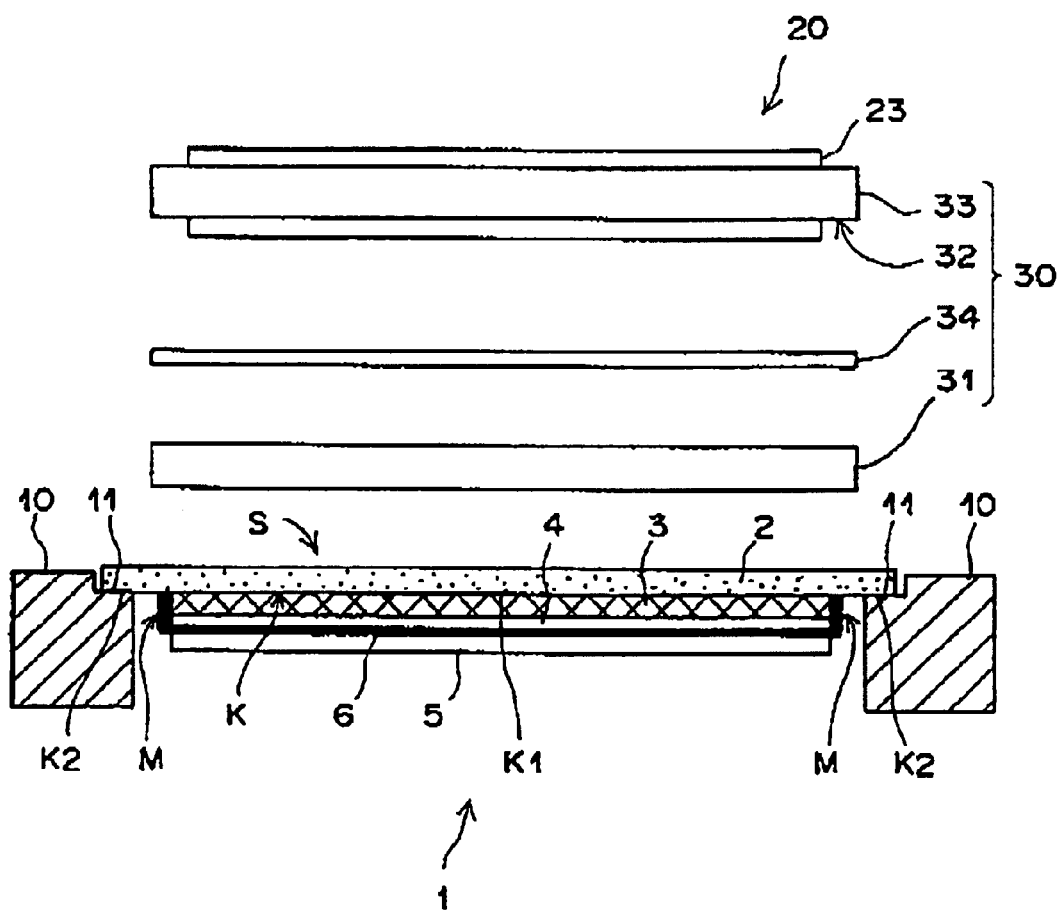
FIG. 2 is a sectional view of the radiation image-reading apparatus of FIG. 1, which is sectioned along the H—H line and viewed from the side of R.
Figure 3:
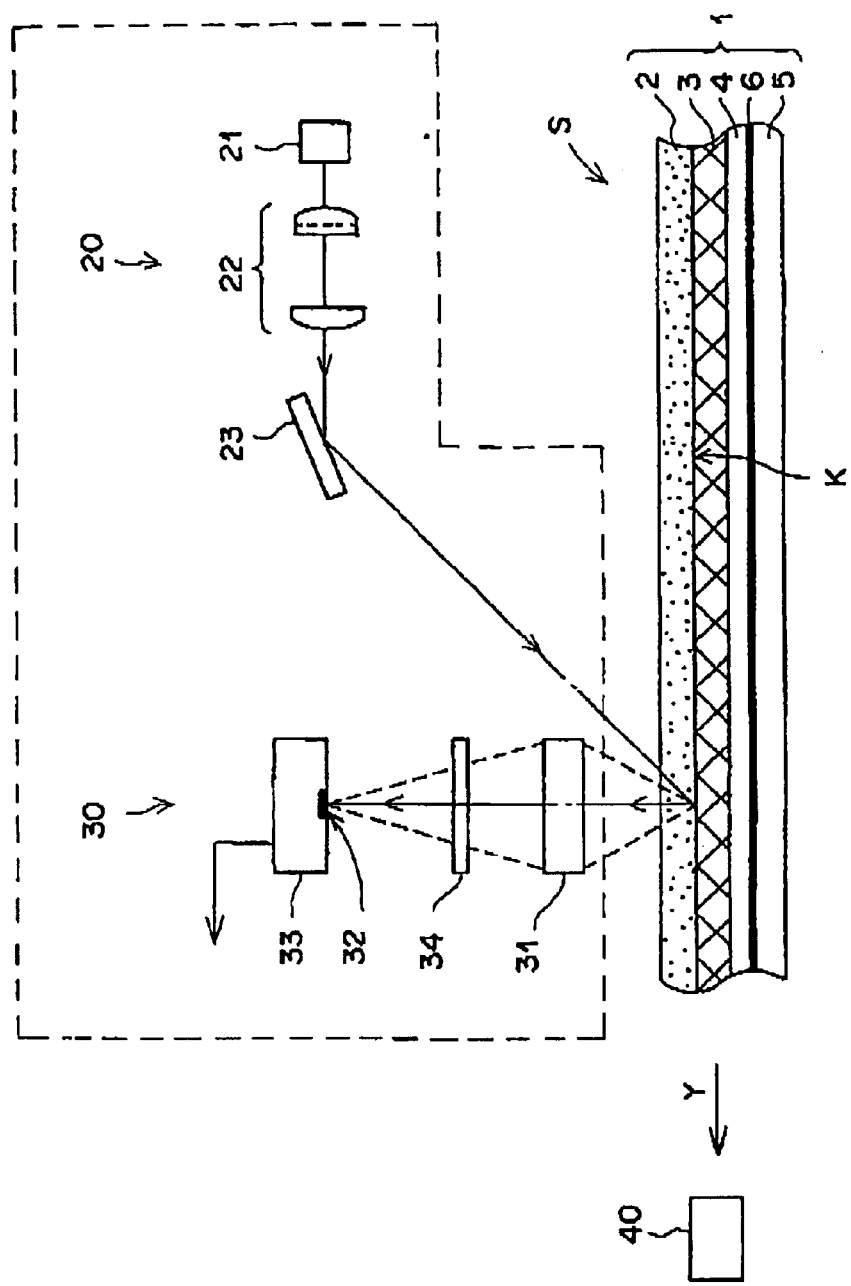
FIG. 3 is a sectional view of the radiation image-reading apparatus of FIG. 1, which is sectioned in a direction perpendicular to the H—H line.

FIG. 1 through FIG. 3 are views explaining a radiation image reading method of the invention in which the stimulable phosphor sheet using a transparent substrate is employed.

The radiation image-reading apparatus 100 of the invention has a stimulable phosphor sheet 1 which comprises a transparent substrate 2 having a reference plane K and a stimulable phosphor layer 3 arranged on the reference plane K at the center portion K1; a supporting means 10 which supports the stimulable phosphor sheet 1 at the side surface areas K2 of the reference plane K; a radiation image reading means which is supported by the supporting means 10 and composed of a stimulating light-applying unit 20 and a stimulated emission-collecting unit 30 (which collects the stimulated emission on the emission-receiving plane 32 of the line sensor 33 from the side of the transparent substrate 2, namely, substrate side S through a lens 31), and a driving means 40 which drives the movement of the stimulable phosphor sheet 1 in relation to the emission-collecting unit 30, that is the movement of the stimulable phosphor sheet and/or the emission-collecting unit 30. In the figures, the emission-collecting means 30 and the supporting means 10 are both fixed to a common base within the reading apparatus 100. The surface profile error (i.e., height of irregularities) on the reference plane K of the transparent substrate 2 is within ±10 μm, and the stimulable phosphor layer 3 has a stimulated emission-reflecting layer 4 on the side not facing the transparent substrate 2. The stimulable phosphor layer 3 is produced by a gas phase-deposition method, and the stimulable phosphor has a prismatic structure extending vertically from the reference plane K of the substrate 2. The transparent substrate 2 has a thickness of 0.7 mm, a width (length of lateral direction) of 40 cm, and a length of 43 cm (in the longitudinal direction), and is made of non-alkali glass. The stimulable phosphor layer 3 is produced from CsBr and EuBr$_2$ by the two dimensional gas phase-deposition method under the following conditions: Electron beam: 3 kV, Pressure: 0.0002 Pa, 30 μm/min.

The produced stimulable phosphor layer 3 is a phosphor membrane composed of prismatic phosphor crystals of a thickness (i.e, width) of 10 μm and a height of 500 μm.

The reflecting layer 4 is a vacuum deposited aluminum layer. Onto the reflecting layer 4 is laminated a carbon resin plate 5 using an epoxy resin 6. The epoxy resin is coated further on the both edge surfaces M of the phosphor layer 3 and the reflecting layer 4 to air-tightly seal the phosphor layer 3 and the reflecting layer 4.

The stimulating light-applying means 20 is composed of a broad area laser 21 emitting a linear stimulating light, a combination 22 of a stimulating light-applying system and a toric lens guiding the stimulating light to linearly apply onto the stimulable phosphor sheet 1 in the direction of arrow X via the below-mentioned reflecting mirror 23, and a reflecting mirror 23 which alters the light-pass of the stimulating light.

The emission-collecting means 30 is composed of a lens 31, a line sensor 33, and a stimulating light-cut filter 34. The lens 31 is composed of a number of lens elements aligned in the direction of arrow X, such as a distributed index lens array, or a micro-lens array. The line sensor 33 contains a number of photoelectric conversion elements having a photoelectric conversion plane 32 which are aligned in the direction of arrow X and receive the stimulated emission having passed through the lens 31. The received emission is converted into electric signals of the radiation image. The stimulating light-cut filter 34 cuts the stimulating light having migrated into the stimulated emission.

The stimulating light-applying means 20 and the stimulated emission-collecting means 30 are combined to give a united structure.

The supporting means 10 has a guide rail plane 11 on which the stimulable phosphor sheet 1 is moved in the direction of arrow Y which is perpendicular to the direction of arrow X. The stimulable phosphor sheet 1 is moved by a driving means 40 in the direction of arrow Y.

In the radiation image-reading procedure, the stimulating light emitting from the broad area laser 21 passes through the stimulating light-applying system 22, is reflected on the mirror 23, and is applied onto the stimulable phosphor layer 3 of the stimulable phosphor sheet 1 on the plane S of the transparent substrate 2. By the application of the stimulating light, the stimulable phosphor layer 3 emits a stimulated emission which passes through the lens 31 and is focused on the photoelectric conversion plane 32 of the line sensor 33. The radiation image-reading procedure is conducted under the condition that the stimulable phosphor sheet 1 is moved on the guiding rail plane 11 of the supporting means 10 in the direction of arrow Y by means of the driving means 40. The exposed area K2 of the reference plane K of the stimulable phosphor sheet 1 is kept in touch with the guiding rail plane 11 during the movement. Accordingly, the guiding rail plane 11 and the reference plane K are placed essentially on the same level.

Figure 4:
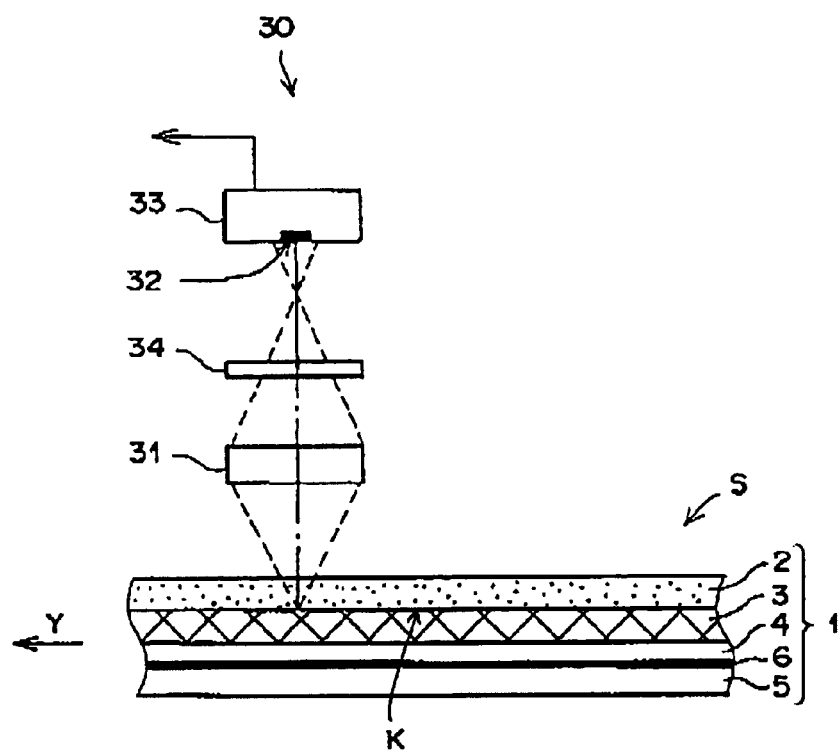
FIG. 4 indicates a case that the stimulated emission emitting from the stimulable phosphor layer does not focus on the stimulated emission-receiving plane of the reading means.

The distance between the guiding rail plane 11 and the emission-collecting means 30 is beforehand determined to focus the stimulated emission emitting from the phosphor layer 3 on the emission-receiving plane 32 of the emission-collecting means 30. If the distance between the guiding rail plane 11 and the emission-collecting means 30 is not accurately adjusted, the stimulated emission does not accurately focus on the emission-receiving plane 32 after passing through the lens 31, as is illustrated in FIG. 4.

Figure 5:
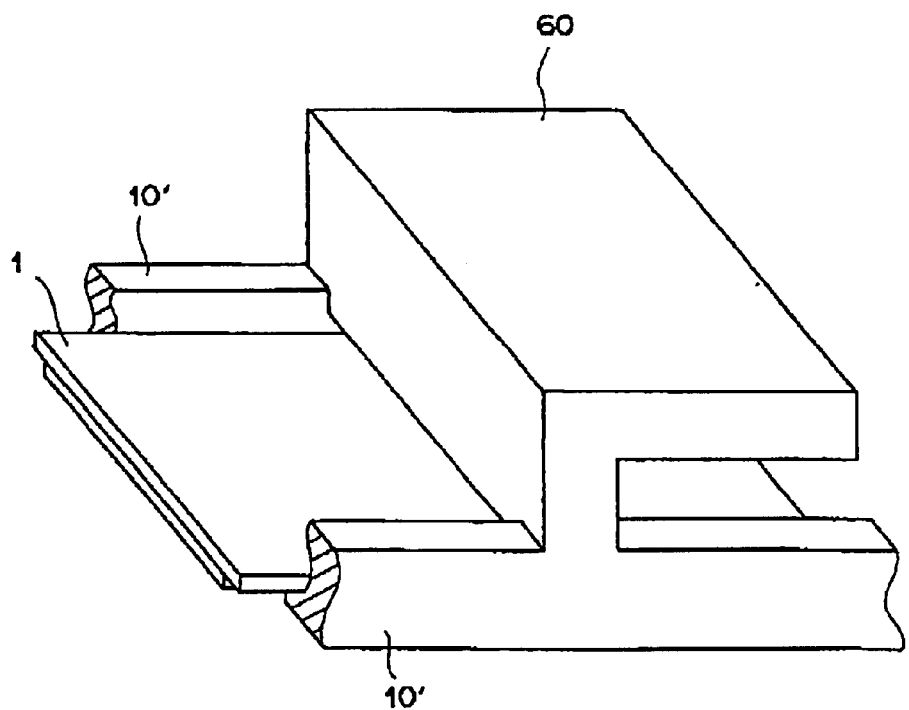
FIG. 5 is a schematic view of a radiation image-reading apparatus in which a radiation image-reading means is fixed to a supporting means in which a stimulable phosphor sheet moves.
Figure 6:
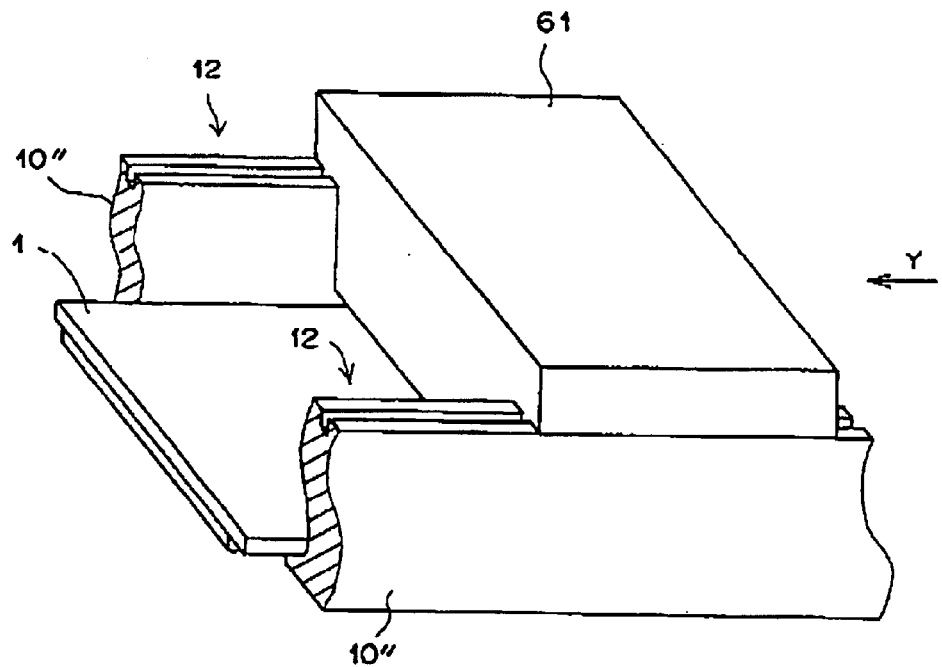
FIG. 6 is a schematic view of a radiation image-reading apparatus in which the stimulable phosphor sheet is fixed to a supporting means on which a radiation image-reading means moves.
Figure 7:
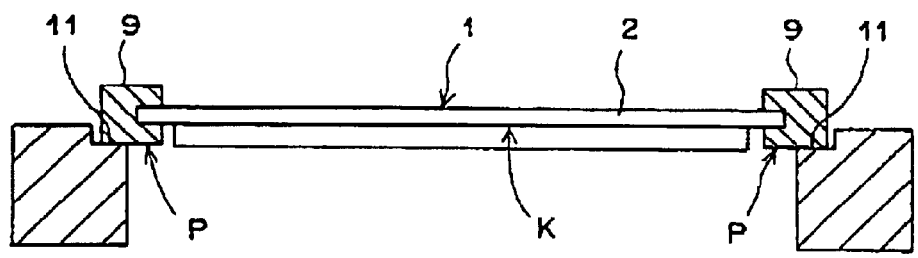
FIG. 7 illustrates one embodiment in which a stimulable phosphor sheet having a guiding reference plane moves on a supporting means.

As is illustrated in FIG. 5, the radiation-image-reading means 60 can be fixed onto a supporting means 10' in which a stimulable phosphor sheet 1 can move. Alternatively, the stimulable phosphor sheet 1 can be fixed within a supporting means 10" on the guiding rail 12 of which a radiation image-reading means 61 can move in the direction of arrow Y, as is illustrated in FIG. 6.

The stimulable phosphor sheet 1 can have a pair of the guide means 9 at the side edges of the transparent substrate 2. The guide means 9 are moved in contact with the guide plane 11 of the supporting means at the bottom surface P.

Figure 8:
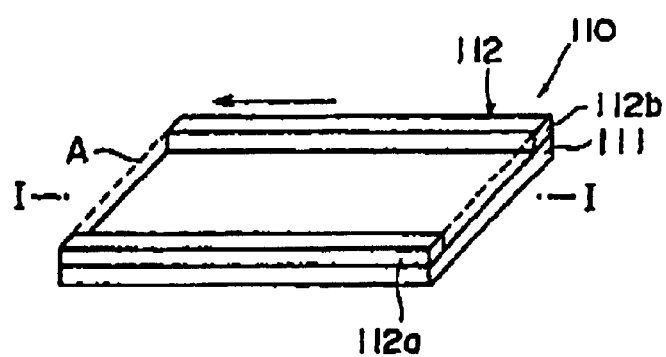
FIG. 8(1) is a sketch showing constitution of an example of the stimulable phosphor sheet of the invention, and FIG. 8(2) is an enlarged sectional view of the phosphor sheet sectioned with I—I line.
Figure 8:
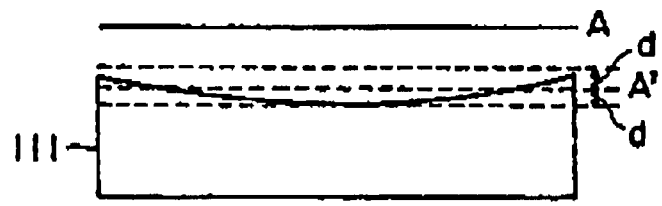

FIG. B(1) is a sketch showing constitution of an example of the stimulable phosphor sheet of the invention, and FIG. 8(2) is an enlarged sectional view of the phosphor sheet sectioned with I—I line. In FIG. 8(1), the stimulable phosphor sheet 110 comprises a stimulable phosphor layer 111 and a reference plane-forming means 112. The reference plane-forming means 112 is composed of a pair of frame members 112a, 112b provided on opposite edges of the phosphor layer 111. The reference plane A is determined as an imaginary plane including the tops of the frame members 112a, 112b.

The size of the stimulable phosphor sheet is determined according to an image-reading area required for the phosphor sheet. It is necessary for the phosphor sheet to have a size larger than the required image-storing area, and each of the longitudinal length and the lateral length generally is 1.1 or more (e.g., 1.2) times as long as those of the image-reading area. Accordingly, each of the longitudinal and the lateral lengths generally is in the range of 10 to 100 cm. The frame members 112a, 112b generally have a width of 1 to 100 mm and a height of 0.1 to 50 mm.

In FIG. 8(2), the stimulable phosphor layer 111 of the stimulable phosphor sheet has a curved surface. The curved surface is within the depth of ±d (d: the depth of focus of the stimulated emission-collecting lens) measured on the basis of an imaginary plane A' parallel to the reference plane A. As described below, the vertical position of the line sensor is practically determined on the basis of the imaginary plane A'. The allowable curvature of the surface of the phosphor sheet depends on what nature of the emission-collecting lens is used, but it preferably is in the range of ±50 $\mu$m, more preferably in the range of ±20 $\mu$m measured from the plane A'.

As described below, the radiation image is read out while an encased emission-collecting unit (which comprises the emission-collecting lens and the line sensor) is moving in the direction of arrow in contact with the tops of the frame members 112a, 112b. Since the emission-collecting unit thus moves on the reference plane A, the emission-collecting lens (which is contained in the emission-collecting unit) simultaneously moves on a plane parallel to the reference plane A. Therefore, it is always ensured that the distance between the surface of the stimulable phosphor layer 111 and the center area of the line sensor varies only within the focal depth (d) of the emission-collecting lens.

With respect to various stimulable phosphor sheets having the constitution shown in FIG. 8(1), the radiation image was read out by means of the radiation image-reading apparatus described below (shown in FIGS. 12 and 13). Accordingly, the surface irregularities or unevenness of the phosphor sheet and sharpness of the obtained image had the relation shown in Table 1. The term "surface irregularities" herein means the difference between the surface and a plane parallel to the reference plane. The emission-collecting lens used herein has a focal depth (which is the range ensuring MTF of 10% or more at 61 p) of 300 $\mu$m.

TABLE 1

| Surface irregularities (±μM) | MTF (%) |
|---|---|
| 0 | 100 |
| 20 | 87 |
| 50 | 70 |
| 300 | 10 |

FIG. 9(1) shows enlarged sectional views of another example of the stimulable phosphor sheet of the invention. In FIG. 9(1), the stimulable phosphor layer 121 has an inclined surface and the reference plane A is also inclined. The inclination of the surface of the phosphor layer 121 is within the focal depth of ±d measured from the plane A' which is parallel to the reference plane A.

In FIG. 9(2), the stimulable phosphor layer 131 has a waving surface, while the reference plane A smoothly curves. The surface irregularities of the phosphor layer 131 is within the focal depth of ±d which is measured from the plane A' parallel to the reference plane A.

As is described above, the reference plane-forming means (frame members) may have inclined or curved tops which is to comply with the surface irregularities of the phosphor layer. Accordingly, the reference plane, which is an imaginary plane including the tops of the frame members, may be inclined or curved. Even in that case, in reading the radiation image, it is always ensured that the distance between the surface of the phosphor layer and the line sensor varies within the focal depth ±d of the emission-collecting lens.

The reference plane-forming means of the invention is not restricted to the embodiment shown in FIG. 8(1) and FIG. 8(2). Any embodiments can be used as long as they are provided outside of the radiation image-storing area of the phosphor sheet so as to indicate the reference plane for determining the vertical position of the line sensor.

FIG. 10(1) and FIG. 10(2) show sectional views showing other examples of the reference plane-forming means according to the invention. In FIG. 10(1), frame members 142a, 142b as the reference plane-forming means 142 are provided on both side edges of the stimulable phosphor layer 141, and a plane including the tops of the frame members 142a, 142b is the reference plane A.

In FIG. 10(2), frame members 152a, 152b as the reference plane-forming means 152 are provided on both sides of the stimulable phosphor layer 151, and a plane including the tops of the frame members 152a, 152b is the reference plane A. In this embodiment, the surface irregularities of the phosphor layer 151 is within the focal depth of i d measured from the reference plane A.

Figure 11:
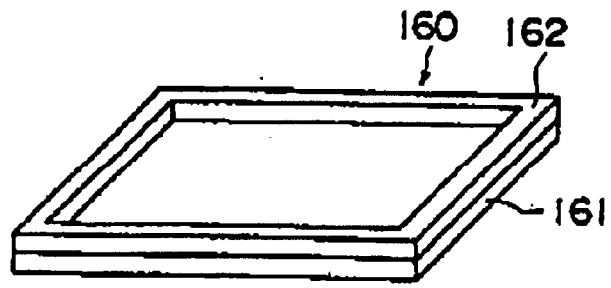
FIG. 11 shows another example of the reference plane-forming means in the form of a frame according to the invention.

FIG. 11 shows another example of the reference plane-forming means according to the invention. In FIG. 11, the reference plane-forming means (or reference plane-indicating means) 162 of the stimulable phosphor sheet 160 is provided at the peripheral edge around the surface of the phosphor layer 161. A plane including the top of the frame 162 is the reference plane A.

The process for preparing the stimulable phosphor sheet of the invention is described below. As the stimulable phosphor, a stimulable phosphor giving a stimulated emission in the wavelength region of 300 to 500 nm when it is irradiated with stimulating light in the wavelength region of 400 to 900 nm is preferably employed.

A particularly preferred stimulable phosphor is an alkali metal halide phosphor having the following formula (I):

$$M^{I}X \cdot aM^{II}X'_2 \cdot bM^{III}X''_3 : zA \quad \text{(I)}$$

in which $M^I$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; each of X, X' and X" independently is at least one halogen selected from the group consisting of F, Cl, Br and I; and a, b and z are numbers satisfying the conditions of $0 \leq a < 0.5$, $0 \leq b < 0.5$ and $0 \leq z < 0.2$.

In the formula (I), at least Cs is preferably included as $M^I$, at least Br is preferably included as X, and A is particularly preferably Eu or Bi. The phosphor of the formula (I) may contain a metal oxide (such as aluminum oxide, silicon dioxide or zirconium oxide) as an additive in an amount of not more than 0.5 mol. based on 1 mol. of $M^I$.

Another preferred stimulable phosphor is a rare earth activated alkaline earth metal fluoride-halide phosphor having the following formula (II):

$$M^{II}FX : zLn \quad \text{(II)}$$

in which $M^{II}$ is at least one alkaline earth metal element selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), Ba is preferably included in an amount of half or more of $M^{II}$, and Ln is particularly preferably Eu or Ce. The $M^{II}FX$ in the formula (II) indicates the crystal structure of BaFX, and it by no means indicates F:X=1:1. The formula (II), therefore, does not indicate resultant stoichiometric composition. It is generally preferred to produce many $F^+(X^-)$ centers (which are vacant lattice points of $X^-$ ion) in a BaFX crystal, so as to enhance the efficiency of emission stimulated by light in the wavelength region of 600 to 700 nm. In many cases, F is in slight excess of X.

One or more of the following additives may be added into the phosphor of the formula (II), if needed, although they are omitted in the formula (II).

$$bA, wN^I, xN^{II}, yN^{III}$$
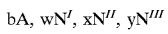

In the above, A is a metal oxide such as $Al_2O_3$, $SiO_2$ or $ZrO_2$. For preventing $M^{II}FX$ particles from sintering, A is preferably inactive to $M^{II}FX$ and is preferably in the form of fine particles (the mean size of primary particles is not more than 0.1 μm). $N^I$ is a compound of at least one alkali metal element selected from the group consisting of Li, Na, K, Rb and Cs; $N^{II}$ is a compound of alkaline earth metal element Mg and/or Be; and $N^{III}$ is a compound of at least one trivalent metal element selected from the group consisting of Al, Ga, In, Ti, Sc, Y, La, Gd and Lu.

The letters b, w, x and y represent added amounts of the additives, based on 1 mol. of $M^{II}FX$ when the additives are added into the phosphor. They satisfy the conditions of $0 \leq b \leq 0.5$, $0 \leq w \leq 2$, $0 \leq x \leq 0.3$ and $0 \leq y \leq 0.3$. The amounts of the additives often decrease during sintering and washing processes, and hence the b, w, x and y do not always indicate the ratios of the components in the resultant phosphor. Some of the additives are not changed to remain in the resultant phosphor, but others are reacted with or incorporated in $M''FX$.

Further, other additives can be added into the phosphor of the formula (II), if needed. Examples of the additives include Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborates; hexafluoro compounds (monovalent or divalent salts of hexafluorosilicate, hexafluorotitanate and hexafluorozirconate); and compounds of transition metal such as V, Cr, Mn, Fe, Co and Ni. Further, whether the additives are incorporated or not, any rare earth activated alkaline earth metal fluoride-halide stimulable phosphor can be used in the invention.

The phosphor used in the invention is not restricted to the stimulable phosphor. A phosphor giving an instant emission in the ultraviolet or visible wavelength region when it absorbs a radiation such as X-rays can be also employed in the invention. Examples of that phosphor include $LnTaO_4$:(Nb,Gd), $Ln_2SiO_5$:Ce, LnOX:Tm (in which Ln is a rare earth element), CsX (in which X is a halogen), $Gd_2O_2S$:Tb, $Gd_2O_2S$:Pr,Ce, $ZnWO_4$, $LuAlO_3$:Ce, $Gd_3Ga_5O_{12}$:Cr,Ce and $HfO_2$.

In the present invention, the phosphor layer can be formed by electron beam-evaporating method, which belongs to the gas phase deposition method. Generally, a phosphor layer formed by the gas phase deposition method comprises only a stimulable phosphor with no binder, and in the phosphor layer there are cracks among the prismatic crystals of the stimulable phosphor. Accordingly, the stimulating light and the stimulated emission are efficiently applied and observed, respectively, and hence a radiation image of high sharpness can be reproduced with high sensitivity. In particular, the electron beam-evaporating method gives regularly aligned prismatic crystals having a good shape. Further, since the vapor source is locally heated and instantly vaporized, the composition of the resultant phosphor in the layer is usually almost the same as that of the phosphor of the vapor source. In contrast, in other gas phase deposition methods, since a component having a high vapor pressure is preferentially vaporized (for example, an activator is vaporized prior to the formation of phosphor matrix), the composition of the resultant phosphor is not coincident with that of the phosphor of the vapor source in many cases.

In the first place, a stimulable phosphor of vapor source and a substrate on which the vapor is to be deposited are set in an vapor-deposition apparatus. The apparatus is then evacuated to $3 \times 10^{-10}$ to $3 \times 10^{-12}$ $kg/cm^2$. Inert gases such as Ar and Ne may be introduced into the apparatus while the vacuum is kept in the above range. As the substance, sheets of quartz glass, metals (e.g., aluminum) and resins (e.g., aramide) are usable.

The stimulable phosphor is preferably compressed to form a pellet. The pressure of compressing is generally in the range of 800 to 1,000 $kg/cm^2$. The phosphor may be heated in the range of 50 to 200° C. during the compressing process, and after the process the obtained pellet may be degassed. By the compressing process, the relative density of the vapor source can be increased. If the vapor source has a low relative density, the phosphor is often so non-uniformly vaporized that the deposited film has an uneven thickness, that bumped substances attach on the substrate or that the activators or additives of the stimulable phosphor are segregated in the deposited film. In place of the stimulable phosphor, a mixture of materials for the production of a stimulable phosphor can be used as the vapor source.

In the second place, an electron beam generated by an electron gun is applied onto the vapor source. The accelerating voltage of electron beam is preferably in the range of 1.5 kV to 5.0 kV.

By applying the electron beam, the stimulable phosphor of vapor source is heated, scattered and accumulated on the substrate. The accumulating rate of the phosphor, namely the deposition rate, generally is in the range of 0.1 to 1,000 $\mu m$/minute, preferably in the range of 1 to 100 $\mu m$/min. The electron beam may be applied twice or more to form two or more phosphor layers. Further, two or more kinds of phosphors may be co-deposited by means of plural electron guns. It is also possible that the phosphor layer be formed on the substrate simultaneously with synthesizing the phosphor from materials. The substrate may be cooled or heated, if needed, during the deposition process, or may be subjected to heating treatment (annealing treatment) after the process.

The vapor-accumulating method used in the invention is not restricted to the electron beam-evaporating method, and various other methods such as resistance-heating method and spattering method can be used.

In the above-described manner, the phosphor layer in which the prismatic crystals of stimulable phosphor are aligned almost perpendicularly to the substrate can be formed. Thus-formed phosphor layer comprises only the stimulable phosphor without a binder, and there are cracks among the prismatic crystals. On the surface of the phosphor layer, both microscopic unevenness (roughness) in the order of 1 to 100 $\mu m$ and macroscopic unevenness extending the whole surface are formed. The microscopic unevenness is caused by minute differences of heights of the prismatic crystals, and the macroscopic unevenness is, for example, inclination, waving, curving and swelling, as shown in FIGS. 8(1), 8(2), 9(1) and 9(2).

The surface of the formed phosphor layer is preferably subjected to various known treatment such as polishing or graining so that the unevenness may be within the depth of focus of the light-collecting lens. It is particularly preferred that the evenness along the direction perpendicular to the direction of arrow in FIG. 8(1) be as high as possible.

The stimulable phosphor layer may be formed by applying and drying a coating solution in which stimulable phosphor particles and a binder are dispersed or dissolved in an appropriate organic solvent. The thus-formed phosphor layer comprises the binder and the phosphor particles dispersed therein. The binder can be optionally selected from various known binder resins.

On the surface and/or on the side of the stimulable phosphor layer, the reference plane-forming means is provided. The reference plane-forming means can be formed by attaching a film of organic polymer (e.g., polyethylene terephthalate) or a glass plate on the phosphor layer with an appropriate adhesive, or by applying and drying a solution containing an organic polymer material (e.g., fluororesins soluble in organic solvents) on the phosphor layer. Otherwise, inorganic compounds may be deposited in the form of a frame on the phosphor layer to form the reference plane-indicating means.

The stimulable phosphor layer with thus-formed reference plane-forming means is then peeled from the substrate to obtain a stimulable phosphor sheet comprising the stimulable phosphor layer and the reference plane-forming means.

On the bottom (reverse) surface of the stimulable phosphor, a rigid support may be provided. It is possible to use the substrate as the support, and in that case the phosphor layer is not peeled from the substrate. Otherwise, after the phosphor layer is peeled from the substrate, the layer may be laminated on another support with an adhesive. The support employed in the invention can be optionally selected from those employed in the conventional stimulable phosphor sheets. It is known that, for improving sensitivity or image quality (sharpness, graininess), a conventional stimulable phosphor-sheet may have a light-reflecting layer containing light-reflecting material such as titanium dioxide and/or a light-absorbing layer containing light-absorbing material such as carbon black. Also in the phosphor sheet of the invention, these layers can be optionally provided according to the purpose and the use of the phosphor sheet. Further, for improving the sharpness of the resultant image, fine hollows or warts may be formed on the phosphor layer-side surface of the support (or on the phosphor layer-side surface of the auxiliary layer such as an undercoating layer (adhesive layer), the light-reflecting layer or the light-absorbing layer, if it is provided).

The rigid support preferably has a modulus of elasticity of $1 \times 10^5$ kgf/cm$^2$ or higher, more preferably in the range of $2 \times 10^5$ kgf/cm$^2$ to $1 \times_{10}^8$ kgf/cm$^2$. The rigid support preferably absorbs the radiation as little as, preferably less than 20%, more preferably less than 10%. Further, from the viewpoint of resistance to water vapor permeation, it preferably has a high air-tightness and low vapor permeability. Accordingly, the rigid support is preferably made of glass sheet, metal sheet such as aluminum film, fiber-reinforced plastic sheet such as sheet of carbon fiber-reinforced plastic (CFRP) or sheet of glass fiber-reinforced plastic (GFRP), or ceramic sheet such as porous ceramic sheet.

The rigid support preferably has a thickness in the range of 100 $\mu$m to 10 mm, more preferably 1 to 10 mm. If the protective film has enough rigidity, there is no necessity to place the rigid support.

In order to keep the phosphor layer from atmospheric moisture, the phosphor layer is preferably encased within the protective layer (film or sheet) and sealed around the layer. The sealing material can be an adhesive or a low-melting glass. Otherwise, a spacer or a frame made of glass, ceramic, metal, or plastic material can be placed between the protective layer and the rigid support using an adhesive. Examples of appropriate adhesives include epoxy resin, phenol resin, cyanoacrylate resin, vinyl acetate resin, vinyl chloride resin, polyurethane resin, acryl resin, ethylene-vinyl acetate resin, polyolefin resin, chloroprene elastomer, nitrile elastomer, and silicone adhesive.

It is preferred to provide a protective film on the surface of phosphor layer, so as to ensure treatability of the stimulable phosphor sheet in transportation and to avoid deterioration. In order not to affect the simulating light or the stimulated emission, the film is preferably transparent. Further, for protecting the phosphor sheet from chemical deterioration and physical damage, the film must be chemically stable, high moisture proof and physically strong.

The protective film can be provided by coating the stimulable phosphor layer with a solution in which a transparent organic polymer (e.g., cellulose derivatives, polymethyl methacrylate, fluororesins soluble in organic solvents) is dissolved in a proper solvent, by laminating a beforehand prepared sheet for the protective film (e.g., a film of organic polymer such as polyethylene terephthalate, a transparent glass plate) on the phosphor layer with an adhesive, or by depositing vapor of inorganic compounds on the phosphor layer. Various additives may be dispersed in the protective film. Examples of the additives include light-scattering fine particles (e.g., particles of magnesium oxide, zinc oxide, titanium dioxide and alumina), slipping agent (e.g., powders of perfluoroolefin resin and silicone resin) and crosslinking agent (e.g., polyisocyanate). The thickness of the protective film is generally in the range of about 0.1 to 20 $\mu$m (if the film is made of polymer material) or in the range of about 100 to 1,000 $\mu$m (if the film is made of an inorganic compound such as glass).

The protective film can be replaced with a rigid transparent protective sheet (or plate). The rigid sheet preferably has a modulus of elasticity of $1 \times 10^5$ kgf/cm$^2$ or higher, more preferably in the range of $2 \times 10^5$ kgf/cm$^2$ to $1 \times 10^8$ kgf/cm$^2$. From the viewpoint of resistance to water vapor permeation, the rigid protective sheet preferably has a high air-tightness and low vapor permeability. Accordingly, the rigid support is preferably made of glass sheet. Examples of preferred glass sheets include Glass sheet 10.7, 0.85, or 1.0 available from Central Glass Co., Ltd., UFF 0.40, 0.50, 0.55, or 0.70 available from Nippon Glass Plate Co., Ltd., and PROQS 40SX available from Asahi Glass Co., Ltd. The rigid protective sheet preferably has a thickness of 200 $\mu$m to 10 mm.

Otherwise, the stimulable phosphor layer is first arranged on the rigid protective sheet, and then a rigid plate is placed on the phosphor layer. There can be placed a different material layer for ensuring uniform space between the phosphor layer and the rigid plate. The different material layer is preferably made of material of a low density and a low radiation absorption. Examples of the materials include non-woven fabric, fabric of natural fiber or synthetic fiber, glass fibers, porous urethane polymer, porous polyethylene terephthalate, porous ceramic, microfilter, resin (preferably, resin having a low density of 1.7 g/cm$^3$ or lower) such as polyethylene terephthalate, polycarbonate, polyurethane, acrylic resin, epoxy resin, and a mixture of hollow particles (hollow polymer particles) and a binder. The binder for dispersing the hollow particles can be polystyrene, polyolefin, polyurethane, polyester, polyamide, polybutadiene, ethylene-vinyl acetate polymer, polyvinyl chloride, natural elastomer, fluororesin elastomer, polyisoprene, chlorinated polyethylene, styrene-butadiene elastomer, silicone elastomer, and other thermoplastic elastomers.

If the material placed between the phosphor layer and the rigid plate is adhesive, the material can be coated on the phosphor layer and then the rigid plate is placed on the coated material. The layer of different material generally has a thickness of 100 $\mu$m to 10 mm, preferably 1 to 5 mm.

It is preferred that a light-discontinuous space (e.g., air space, specific refractive index layer) is placed between the stimulable phosphor layer and the protective sheet, so as to control of the emitting direction of stimulated emission for the purpose of increase of amount of the stimulated emission collected by the lens.

For enhancing the resistance to stain, a fluororesin layer is preferably provided on the protective film. The fluororesin layer can be form by coating the surface of the protective film with a solution dissolving (or dispersing) a fluororesin in an organic solvent, and drying the applied solution. The fluororesin may be used singly, but in usual a mixture of the fluororesin and a film-forming resin is employed. In the mixture, an oligomer having polysiloxane structure or perfluoroalkyl group can be further added. In the fluororesin layer, fine particle filler may be incorporated so as to reduce blotches caused by interference and to improve the quality of the resultant image. The thickness of the fluororesin layer is generally in the range of 0.5 to 20 $\mu$m.

In the case where the protective film or the fluororesin layer is formed on the stimulable phosphor layer, the reference plane-indicating means is provided on the surface of the film or the resin layer and/or on the side of the stimulable phosphor layer and the film or the resin layer, so that the unevenness of the film or the resin layer may be within the depth of focus of the light-collecting lens.

Thus, the stimulable phosphor sheet of the invention can be prepared. The phosphor sheet of the invention may have known various structures. For example, in order to improve the sharpness of the resultant image, at least one of the above layers may be colored with a colorant which does not absorb the stimulated emission but the stimulating light.

The radiation image information-reading apparatus of the invention suitable for the above-described stimulable phosphor sheet is explained below by referring to the attached drawings.

Figure 12:
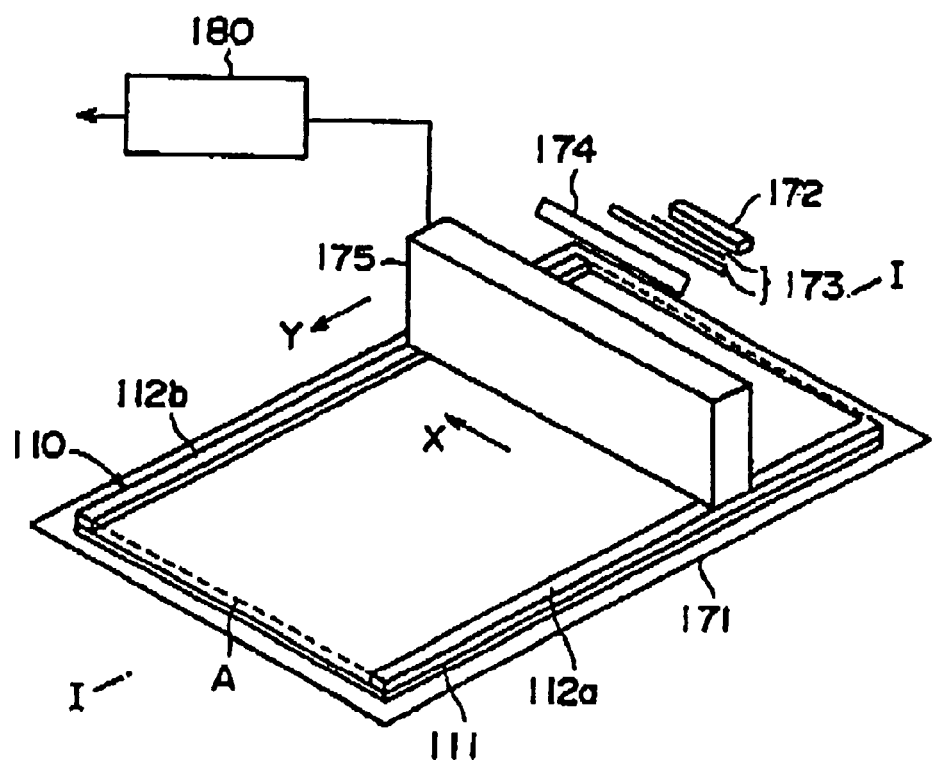
FIG. 12 is a sketch showing an example of the radiation image-reading apparatus of the invention.
Figure 13:
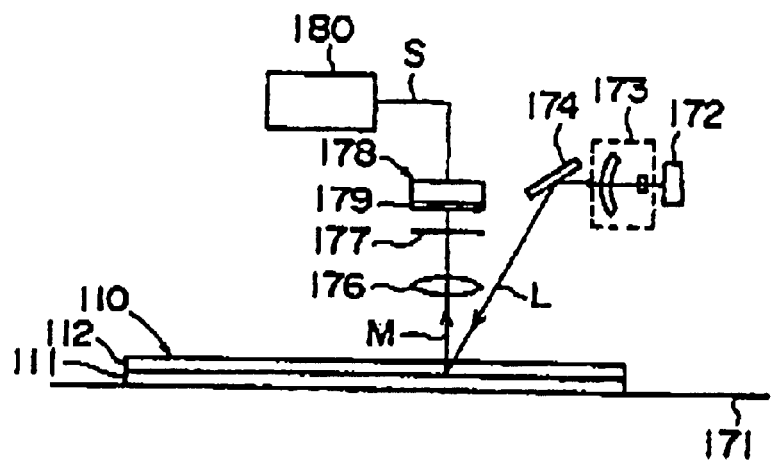
FIG. 13 is a schematic sectional view of the apparatus shown in FIG. 12 sectioned with I—I line.

FIG. 12 is a sketch showing an example of the radiation image information-reading apparatus of the invention, and FIG. 13 is a schematic sectional view of the apparatus shown in FIG. 12 sectioned with I—I line.

In FIGS. 12 and 13, the radiation image-reading apparatus comprises: a stage 171 on which a stimulable phosphor sheet 110 is placed; a broad area laser (hereinafter referred to as BLD) 172 which linearly emits stimulating light L almost parallel to the surface of the phosphor sheet 110; an optical system 173 which comprises a collimator lens and a toric lens and through which the stimulating light L are converted into parallel beams; a variable mirror 174 which reflects the stimulating light L with the angle sequentially changed so that the light L may be applied on the surface of the phosphor sheet 110 linearly along the arrow direction of X; a boxed light-detecting means 175 which collects and detects stimulated emission M induced by irradiation of the stimulating light L and emitted from the phosphor sheet 110, while the means 175 is moving synchronously with the variable mirror 174, parallel to the reference plane A, along the direction of arrow indicated by Y and in contact with the tops of the frame members 112a and 112b on the phosphor sheet 110; and a radiation image-reading means 180 in which signal S output from the emission-collecting means 175 is processed according to the position of the phosphor sheet 110 and then which outputs electric image signals. In the radiation image information-reading apparatus, it is preferred that the stimulating light-applying system (the broad area laser 171 to the variable mirror 174) and the stimulated emission-collecting system (light-detecting means 175) move synchronously.

The encased emission-collecting means 175 contains: a distributed index lens array (an array of many distributed index lenses, hereinafter referred to as 'SELFOC lens array) 176 which focuses the stimulated emission M on a line sensor 178; a stimulating light-cutting filter 177 which transmits the stimulated emission M but which does not transmit the stimulating light L in order to cut off the light L reflected by the surface of the phosphor sheet 110 and slightly contaminating the stimulated emission M; and the line sensor 178 comprising many arrayed photoelectric converting elements 179 which receive and photoelectrically convert the stimulated emission M. The emission-collecting means 175 moves on the reference plane A above the phosphor sheet A so that it may be always positioned just above the area exposed to the stimulating light L.

As shown in FIG. 8(1) and FIG. 8(2), the stimulable phosphor sheet 110 comprises a stimulable phosphor layer 11 and frame members 112a, 112b of the reference plane-forming means. Owing the provision of frame members 112a, 112b, the phosphor sheet 110 has the reference plane A.

The broad area laser (BLD) 172 is placed along the arrow X, and emits visible light in the wavelength region of 630 to 690 nm. The variable mirror 174 reflects the stimulating light L with the angle changed so that the light L may be applied on the surface of the phosphor sheet 110 linearly along the direction of arrow indicated by X while moving sequentially in the direction of arrow indicated by Y.

The SELFOC lens array 176 isometrically forms an image of the stimulated emission M-emitting area of the phosphor sheet 110 on the emission-receiving plane of the line sensor 178.

The line sensor 178 comprises many (for example, 1,000 or more) photoelectric converting elements (CCDs, charge coupled devices) 179 arrayed along the arrow X. Each element has a photo-receiving face (size: approx. 100 $\mu$m×100 $\mu$m), and corresponds to one pixel. This means that each element receives the stimulated emission M emitted from an area of approx. 100 $\mu$m×100 $\mu$m on the phosphor sheet 110.

The radiation image-reading process using the apparatus and the stimulable phosphor sheet described above can be performed in the following manner.

The stimulable phosphor sheet 110 is beforehand exposed to radiation (such as X-rays) having passed through an object, and hence radiation image information of the object is recorded and stored in the phosphor sheet 110. The phosphor sheet 110 is then placed on the stage 171. The BLD 172 linearly emits stimulating light L almost parallel to the surface of the phosphor sheet 110. The stimulating light L pass through the optical system 173 comprising a collimator lens and a toric lens, and are thereby converted into parallel beams. The beams L are then reflected by the variable mirror 174, and applied on the phosphor sheet 110 linearly along the direction of arrow indicated by X. By the variable mirror 174, the stimulating light L are linearly applied on the phosphor sheet 110 while sequentially moving in the direction of arrow indicated by Y.

The stimulated emission M is induced by the stimulating light L linearly applied on the phosphor sheet 110, and is emitted from the exposed area and the area nearby. The emission M has an intensity according to the stored radiation image information.

The stimulated emission M is then focused on the photo-receiving faces of the photoelectric converting elements 179 constituting the line sensor 178 by means of the SELFOC lens array 176 in the light-detecting means 175 which moves on the reference plane A synchronously with the variable mirror 174. The moving speed of the light-detecting means 175 is input into the radiation image-reading means 180.

The stimulated emission M having passed through the SELFOC lens array 176 is slightly contaminated with the stimulating light L reflected by the surface of the phosphor sheet 110, and hence the contaminating light L are cut off with a stimulating ray-cutting filter 177.

The stimulated emission M received by the converting elements 179 is photoelectrically converted into signals Q, which are then input into the image-reading means 80. In the image-reading means 180, the signals Q are processed on the basis of the moving speed of the emission-collecting means 175 to obtain image data according to the positions of the phosphor sheet 110. The thus-obtained image data are output on an image-displaying apparatus (not shown).

The radiation image information-reading apparatus of the invention is not restricted to the embodiment shown in FIGS. 12 and 13. Each part of the apparatus (such as the light source, the emission-collecting optical system between the light source and the phosphor sheet, the optical system between the phosphor sheet and the line sensor, or the line sensor) may have various known constitution.

Figure 14:
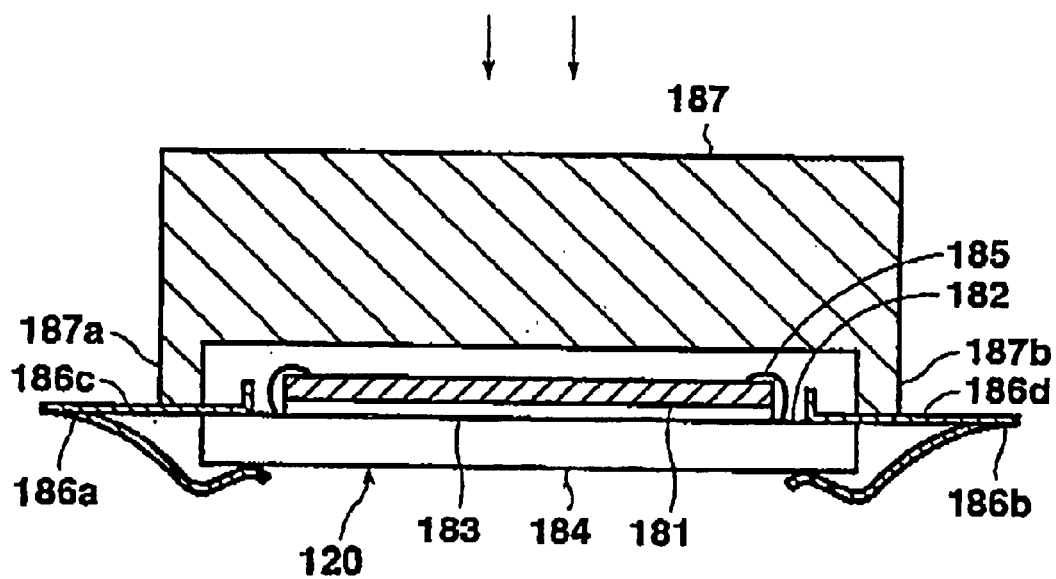
FIG. 14 illustrates a combination of a stimulable phosphor sheet having a guiding reference plane-forming means and a radiation image-reading means according to the invention.

For example, as is illustrated in FIG. 14, the stimulable phosphor sheet can be fixed onto a supporting means at the side areas along the longitudinal direction, and the emission-collecting means can be moved on the supporting means.

FIG. 14 is a schematic section view illustrating a constitution of a reading apparatus in which the relationship between the supporting means for the phosphor sheet and the emission-collecting means in the reading apparatus. The arrow indicates the directions of X-ray irradiation and application of the stimulating light. In FIG. 14, a stimulable phosphor sheet 120 (181: stimulable phosphor layer having a transparent protective layer on its upper surface and a support sheet on its lower surface, 183: adhesive layer, 184: rigid plate, 185: sealing material) has a reference plane-forming means 182 which corresponds to the exposed surface of the rigid plate 184. The stimulable phosphor sheet 120 is supported horizontally at both side areas (including the reference plane-forming means 182) using a supporting means 186a, 186b made of plate spring. On the upper surfaces 186c, 186d of the plate springs 186a, 186b, the reading apparatus forms its reference plane. The emission-collecting means 187 has the sliding portions 187a, 187b which move on the plate springs 186a, 186b along the reference planes 186c, 186d.

The stimulable phosphor sheet can be read during its horizontal or vertical movement using an apparatus similar to that of FIG. 14. In that case, the stimulable phosphor sheet preferably has a rigid sheet or plate at least on one side.

As the line light source, a light source having a linear shape may be used. Further, a fluorescent lamp, a cold cathode fluorescent lamp and a LED (light-emitting diode) array can be also used. The line light source may emit the stimulating light either continuously or intermittently in the form of pulses. In consideration of lowering noises, the stimulating light are preferably in the form of pulses with high power.

In place of the SELFOC lens array, a micro-lens array can be used. Examples of the line sensor other than a CCD sensor include an amorphous silicon sensor, a CCD with back illuminator and MOS image sensor. The boxed light-detecting means may have protuberances on the surface contacting with the reference plane of the phosphor sheet.

In the above embodiment, the optical system between the phosphor sheet and the line sensor is designed to form an image isometrically for simplifying the explanation. However, a magnifying or reducing optical system may be used. In consideration of increasing the light-collecting efficiency, an isometrical or magnifying optical system is preferred.

An image-processing means, in which image data signals output from the radiation image-reading means are subjected to various signal processing, may be installed. Further, an image-output means, by which a visible image is displayed from the image data signals on a CRT or on a dry film, may be installed. Furthermore, a pulling-out means, by which a stimulable phosphor sheet contained in a cassette is drawn out, may be installed. An erasing means, in which radiation energy remaining in the phosphor sheet after reading is adequately released, may be also installed.

According to the present invention, the reference plane-indicating means is provided on a stimulable phosphor sheet so that the surface unevenness or irregularity of the phosphor sheet may be within the focal depth of the emission-collecting optical system. Further in the apparatus of the invention, the emission-collecting means reads the image information while moving in contact with the reference plane of the phosphor sheet so that the vertical position of the phosphor sheet can be accurately determined. Therefore, no matter how uneven thickness the phosphor sheet has, variation of the distance between the line sensor and the surface of the phosphor layer can be kept within the focal depth of the emission-collecting optical system. It is also possible to rapidly obtain a radiation image having even image quality (such as sharpness) since the vertical position can be accurately determined. For these reasons, the stimulable phosphor sheet and the radiation image-reading apparatus of the invention are advantageously used particularly in radiography for medical diagnosis, industrial radiography and fluoroscopy.

The present invention is further described by the following examples.

EXAMPLE 1

1) Stimulable phosphor particles (BaF(Br,I):Eu) and a polyurethane resin were dispersed in an organic solvent in a weight ratio of 20:1, to prepare a phosphor dispersion. The phosphor dispersion was coated on a temporary support having a releasable coat. The coated dispersion was dried to give a phosphor film. The phosphor film was separated from the temporary support, and pressed under heating on a support having a subbing layer. Subsequently, a protective layer was placed on the phosphor film, to give a stimulable phosphor film (410 mm×430 mm, thickness: approx. 250 $\mu$m) placed on a support.

2) The support on which the stimulable phosphor film was attached was placed on a polished aluminum plate (rigid substrate, 430 mm×450 mm, thickness: 10 mm) via a double side adhesive film (thickness of adhesive layer: 60 $\mu$m ).

3) The circumferential areas of the phosphor film, support, and adhesive film was coated with a silicone resin solution. The coated solution was dried to seal the phosphor film, to prepare a stimulable phosphor sheet arranged on a rigid plate, as illustrated in FIG. 14.

The surface irregularities of the phosphor film were within ±13 $\mu$m, based on a plane parallel to the reference plane.

EXAMPLE 2

1) A stimulable phosphor (CsBr:Eu) was deposited on a glass plate (430 mm×450 mm, thickness: 0.63 mm) by an electron beam deposition method, to produce a stimulable phosphor sheet composed of the glass plate and a stimulable phosphor layer (410 mm×430 mm, thickness: approx. 500 $\mu$m) in which prismatic phosphor crystals extending almost vertically from the glass plate were densely aligned.

2) Separately, a glass spacer (thickness: 500 $\mu$m) was formed on a circumferential area of a glass sheet (rigid protective sheet, 430 mm×450 mm, thickness: 8 mm) using a sealing adhesive resin (main component: acrylic resin.

Figure 15:
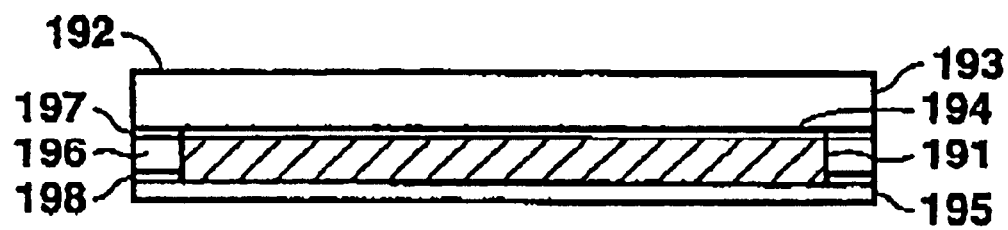
FIG. 15 illustrates a stimulable phosphor sheet having guiding reference plane-forming means.

3) On the glass spacer was placed via adhesive the stimulable phosphor sheet under the conditions that the phosphor layer was enclosed with the spacer and the glass sheet and the phosphor layer did not become in contact with the glass sheet to produce an optically discontinuous space between the phosphor layer and the glass sheet, as illustrated in FIG. 15.

In FIG. 15, the stimulable phosphor sheet is composed of a protective sheet 193, an optically discontinuous space 194, a deposited stimulable phosphor layer 191, and a substrate 195. The circumferential portions of the phosphor layer 191 were sealed with the glass spacer 196 and the sealing resin coat 197, 198. The reference plane 192 corresponds to the upper surface of the protective sheet 193. This stimulable phosphor sheet is exposed to X-rays on the side of the substrate 195, and the stimulation is performed through the upper protective sheet 193.

The surface irregularities of the deposited phosphor film were within ±20 μm, based on a plane parallel to the reference plane.

EXAMPLE 3

1) A stimulable phosphor (CsBr:Eu) was deposited on a glass plate (430 mm×450 mm, thickness: 8 mm) by an electron beam deposition method, to produce a stimulable phosphor sheet composed of the glass plate and a stimulable phosphor layer (410 mm×430 mm, thickness: approx. 500 μm) in which prismatic phosphor crystals extending almost vertically from the glass plate were densely aligned.

Figure 16:
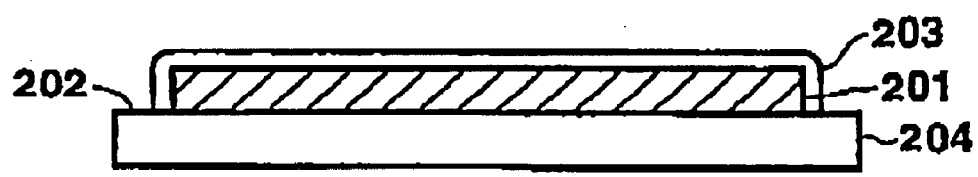
FIG. 16 illustrates another stimulable phosphor sheet having guiding reference plane-forming means.

2) A transparent moisture-proof film (thickness: 60 μm, GL-Au, available from Toppan Printing Co., Ltd.) was placed on the phosphor layer and the glass plate to adhere to the glass plate via adhesive, to form a protective layer, as illustrated in FIG. 16.

In FIG. 16, the stimulable phosphor sheet is composed of a protective layer 203, a deposited stimulable phosphor layer 201, and a glass plate (rigid plate) 204. The reference plane 202 corresponds to the exposed surface of the glass plate 204. This stimulable phosphor sheet is exposed to X-rays on the side of the upper protective layer 203, and the stimulation is also performed through the upper protective layer 203.

The surface irregularities of the deposited phosphor film were within ±50 μm, based on a plane parallel to the reference plane.

EXAMPLE 4

1) A stimulable phosphor (CsBr:Eu) was deposited on a glass plate (rigid plate, 430 mm×450 mm, thickness: 8 mm) by an electron beam deposition method, to produce a stimulable phosphor sheet composed of the glass plate and a stimulable phosphor layer (410 mm×430 mm, thickness: approx. 500 μm) in which prismatic phosphor crystals extending almost vertically from the glass plate were densely aligned.

2) Separately, a glass spacer (thickness: 500 μm) was formed on a circumferential area of a glass sheet (protective sheet, 430 mm×450 mm, thickness: 0.7 mm) using a sealing adhesive resin (main component: acrylic resin).

Figure 17:
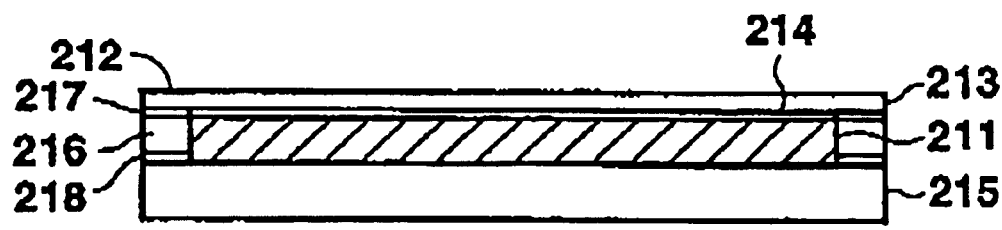
FIG. 17 illustrates a further stimulable phosphor sheet having guiding reference plane-forming means.

3) On the glass spacer was placed via adhesive the stimulable phosphor sheet under the conditions that the phosphor layer was enclosed with the spacer and the glass sheet and the phosphor layer did not become in contact with the glass sheet to produce an optically discontinuous space between the phosphor layer and the glass sheet, as illustrated in FIG. 17.

In FIG. 17, the stimulable phosphor sheet is composed of a protective sheet 213, an optically discontinuous space 214, a deposited stimulable phosphor layer 211, and a rigid substrate 215. The circumferential portions of the phosphor layer 211 were sealed with the glass spacer 216 and the sealing resin coat 217 218. The reference plane 212 corresponds to the upper surface of the protective sheet 213. This stimulable phosphor sheet is exposed to X-rays on the side of the substrate 213, and the stimulation is also performed through the upper protective sheet 213.

The surface irregularities of the deposited phosphor film were within +50 μm, based on a plane parallel to the reference plane.

What is claimed is:

1. A method for reading a radiation image from a stimulable phosphor layer comprising the steps of:
   (a) applying a stimulating light with a stimulating light-applying unit onto an area of the stimulable phosphor layer, wherein the stimulable phosphor layer has inherent surface irregularities, and wherein the stimulable phosphor layer has a means for forming a reference plane to track the surface irregularities; whereby a stimulated emission emits from said light-applied area of the stimulable phosphor layer through a lens, the lens having a focal depth measured from a mean height of the stimulable phosphor layer; and wherein an intensity of the stimulated emission corresponds to a level of energy stored by phosphors in said light-applied area of the stimulable phosphor layer;
   (b) receiving the stimulated emission emitting through the lens with a stimulated emission-receiving plane, wherein the stimulated emission-receiving plane is spaced at a distance from the light-applied area of the stimulable phosphor layer, and wherein the distance is predetermined so as to focus the stimulated emission emitting through the lens onto the stimulated emission-receiving plane;
   (c) photoelectrically converting the stimulated emission into electrical signals;
   (d) repeating (a) through (c) for every area of the stimulable phosphor layer, wherein the distance is maintained by the reference plane forming means such that the distance varies only within the focal depth; and
   (e) assembling the electrical signals to form the radiation image.

2. The method of claim 1, wherein the reference plane-forming means comprise a substrate on the side of the stimulable phosphor layer facing the lens; wherein the reference plane corresponds to the interface between the substrate and the stimulable phosphor layer, and wherein the stimulable phosphor layer is supported at the reference plane by the substrate on supporting means, the supporting means maintaining the distance between the phosphor layer and the stimulated emission-receiving plane.

3. The method of claim 2, wherein the substrate is a transparent substrate, and wherein the stimulated emission emits first through the transparent substrate and second through the lens.

4. The method of claim 3, wherein the transparent substrate is a rigid transparent substrate.

5. The method of claim 4, wherein the transparent substrate is a glass sheet.

6. The method of claim 2, wherein the stimulated emission passes through the lens without passing through the substrate.

7. The method of claim 2, wherein the substrate is a rigid substrate.

8. The method of claim 7, wherein the rigid substrate is made of material having a modulus of elasticity of 1×10$^5$ kgf/cm$^2$ or higher, and wherein the rigid substrate has a thickness in the range of 200 μm to 10 mm.

9. The method of claim 1, wherein the reference plane-forming means comprise frame members on the side of the stimulable phosphor layer facing the lens; wherein the frame members form the reference plane parallel to the surface of the stimulable phosphor layer, and wherein a stimulated emission-collecting unit is supported by the frame members, whereby the distance between the phosphor layer and the stimulated emission-receiving plane is maintained.

10. The method of claim 1, wherein the stimulable phosphor layer is moved relative to the stimulate-emission receiving plane.

11. The method of claim 1, wherein the stimulated-emission receiving plane is contained within a stimulated emission-collecting unit, and wherein the stimulated emission collecting unit is moved relative to the stimulable phosphor layer.

12. The method of claim 1, wherein the stimulable phosphor layer has a surface irregularity within a range of ±100 µm.

13. The method of claim 1, wherein the stimulable phosphor layer has a surface irregularity within a range of ±50 µm.

14. The method of claim 1, wherein the stimulable phosphor layer further comprises a stimulated emission-reflecting layer on a side opposite the substrate.

15. The method of claim 1, wherein the stimulable phosphor layer is produced by a gas phase deposition method.

16. The method of claim 1, wherein the stimulating light-applying unit and the stimulated emission-receiving plane are arranged on a side of the stimulable phosphor layer having the reference plane-forming means.

17. A radiation image reading apparatus comprising:
(a) a stimulating light-applying unit, wherein said stimulating light-applying unit stimulates an area of a stimulable phosphor layer, whereby a stimulated emission emits from the light-applied area;
(b) a stimulated emission-collecting unit, said stimulated emission-collecting unit comprising a stimulated emission-receiving plane and a lens, the lens having a focal depth; wherein said stimulated emission-collecting unit receives stimulated emissions from the stimulable phosphor layer, wherein said stimulated emission-collecting unit photoelectrically converts the stimulated emissions into electrical signals, and wherein said stimulated emission-collecting unit assembles the electrical signals into a radiation image;
(c) supporting means, wherein the supporting means are arranged in a position fixed in relation to said stimulated emission-collecting unit, and wherein the supporting means allow movement of the stimulable phosphor layer along a reference plane by supporting the stimulable phosphor layer at the reference plane, such that a distance between the phosphor layer and the stimulated emission-receiving plane varies only within the focal depth, and
(d) a driving means for driving the movement of the stimulable phosphor layer.

18. A radiation image reading apparatus comprising:
(a) a stimulating light-applying unit, wherein said stimulating light-applying unit stimulates an area of a stimulable phosphor layer, whereby a stimulated emission emits from the light-applied area,
(b) a stimulated emission-collecting unit, said stimulated emission-collecting unit comprising a stimulated emission-receiving plane and a lens, the lens having a focal depth; wherein said stimulated emission-collecting unit receives stimulated emissions from the stimulable phosphor layer, and wherein said stimulated emission-collecting unit photoelectrically converts the stimulated emissions into electrical signals, and wherein said stimulated emission-collecting unit assembles the electrical signals into a radiation image,
(c) supporting means, wherein the supporting means are arranged in a position fixed in relation to the stimulable phosphor layer, wherein the supporting means allow movement of said stimulated emission-collecting unit, and wherein the supporting means support the stimulable phosphor layer at a reference plane, such that a distance between the phosphor layer and the stimulated emission-receiving plane varies only within said focal depth, and
(d) a driving means for driving the movement of the stimulated emission-collecting unit.

19. A radiation image reading apparatus comprising:
(a) a stimulating light-applying unit, wherein said stimulating light-applying unit stimulates an area of a stimulable phosphor layer, whereby a stimulated emission emits from the light-applied area; wherein the stimulable phosphor layer has frame members attached to a surface thereof, the frame members tracking irregularities of the stimulable phosphor layer surface;
(b) a stimulated emission-collecting unit, said stimulated emission-collecting unit receiving stimulated emissions from the stimulable phosphor layer, wherein said stimulated emission-collecting unit contacts the frame members, wherein said stimulated emission-collecting unit photoelectrically converts the stimulated emissions into electrical signals, and wherein said stimulated emission-collecting unit assembles the electrical signals into a radiation image; and
(c) a driving means for driving the movement of said stimulated emission-collecting unit relative to the stimulable phosphor layer.

20. A radiation image reading apparatus comprising:
(a) a stimulating light-applying unit, wherein said stimulating light-applying unit stimulates an area of a stimulable phosphor layer, whereby a stimulated emission emits from the light-applied area; wherein the stimulable phosphor layer has frame members attached to a surface thereof, the frame members tracking irregularities of the stimulable phosphor layer surface;
(b) a stimulated emission-collecting unit, said stimulated emission-collecting unit receiving stimulated emissions from the stimulable phosphor layer, wherein said stimulated emission-collecting unit contacts the frame members, wherein said stimulated emission-collecting unit photoelectrically converts the stimulated emissions into electrical signals, and wherein said stimulated emission-collecting unit assembles the electrical signals into a radiation image; and
(c) a driving means for driving the movement of the stimulable phosphor layer relative to said stimulated emission-collecting unit.

21. A stimulable phosphor sheet comprising: a stimulable phosphor layer and frame members; wherein said stimulable phosphor layer has a surface with irregularities, wherein said frame members form a reference plane parallel to the surface of the stimulable phosphor layer, and wherein said frame members are capable of supporting a stimulated emission-collecting unit at the reference plane.

22. A stimulable phosphor sheet comprising: a stimulable phosphor layer and a transparent substrate layer, wherein said stimulable phosphor layer has a surface with irregularities, wherein said transparent substrate layer forms a reference plane at an interface of said transparent substrate and said stimulable phosphor layer, wherein said transparent substrate has overhanging areas, and wherein said phosphor layer is capable of being supported at the reference plane by the overhanging areas of said transparent substrate layer.

23. The stimulable phosphor sheet of claim 21 or claim 22, wherein said stimulable phosphor layer has a curved, deformed, or sloping surface.

24. The stimulable phosphor sheet of claim 21 or claim 22, wherein said stimulable phosphor layer is produced by a gas phase deposition.

* * * * *